(12) United States Patent
Ohkita

(10) Patent No.: US 7,945,708 B2
(45) Date of Patent: May 17, 2011

(54) APPARATUS AND METHOD OF RECEIVING DATA FROM AUDIO/VIDEO EQUIPMENT

(75) Inventor: Hideki Ohkita, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 218 days.

(21) Appl. No.: 12/351,475

(22) Filed: Jan. 9, 2009

(65) Prior Publication Data

US 2009/0138935 A1    May 28, 2009

Related U.S. Application Data

(63) Continuation of application No. PCT/JP2008/061599, filed on Jun. 19, 2008.

(30) Foreign Application Priority Data

Jun. 25, 2007 (JP) .................................. 2007-166635

(51) Int. Cl.
*G06F 3/00* (2006.01)
*G06F 13/12* (2006.01)
*G06F 7/04* (2006.01)

(52) U.S. Cl. .................. 710/14; 710/8; 710/36; 710/62; 726/2

(58) Field of Classification Search ........................ None
See application file for complete search history.

(56) References Cited

U.S. PATENT DOCUMENTS

| 2004/0239816 | A1* | 12/2004 | Ando ............................ 348/705 |
| 2006/0000177 | A1 | 1/2006 | Salzano et al. | |
| 2007/0036158 | A1 | 2/2007 | Hun-Kwon et al. | |
| 2007/0055876 | A1 | 3/2007 | Choi | |
| 2007/0057931 | A1 | 3/2007 | Takamori | |

FOREIGN PATENT DOCUMENTS

| EP | 1761052 A2 | 3/2007 |
| JP | 2004-357029 | 12/2004 |
| JP | 2006-203725 | 8/2006 |
| JP | 2006-350919 | 12/2006 |
| JP | 2007-078980 | 3/2007 |
| JP | 2007-134956 | 5/2007 |
| WO | 2007/049556 A1 | 5/2007 |

OTHER PUBLICATIONS

International Search Report and Written Opinion for PCT application No. PCT/JP2008/061599 dated Sep. 9, 2008.
High-Definition Multimedia Interface, Specification Version 1.3a; HDMI Licensing, LLC; Nov. 10, 2006.
State Intellectual Property Office of P.R.C. application No. 200880000481.9, Notification of the First Office Action, mailed Apr. 29, 2010 (English translation).
"Extended European Search Report Dated Oct. 7, 2010", European Patent Application No. 08777611.8.
"High-Definition Multimedia Specification, specification version 1.3", Jun. 22, 2006, XP030001519.

* cited by examiner

*Primary Examiner* — Alan Chen
(74) *Attorney, Agent, or Firm* — Blakely, Sokoloff, Taylor & Zafman LLP

(57) ABSTRACT

According to one embodiment, a data receiver apparatus comprises input ports complying with a digital interface standard, wherein each input port comprises a voltage signal terminal receiving a prescribed voltage signal, a detection terminal outputting a connection detection signal, a data input terminal receiving a data signal, and an address terminal transmitting a physical address. A nonvolatile memory is connected to the address terminal. A connection detection signal output from the detection terminal is set to a detection-state voltage irrespective of whether the data input terminal is selected.

9 Claims, 4 Drawing Sheets

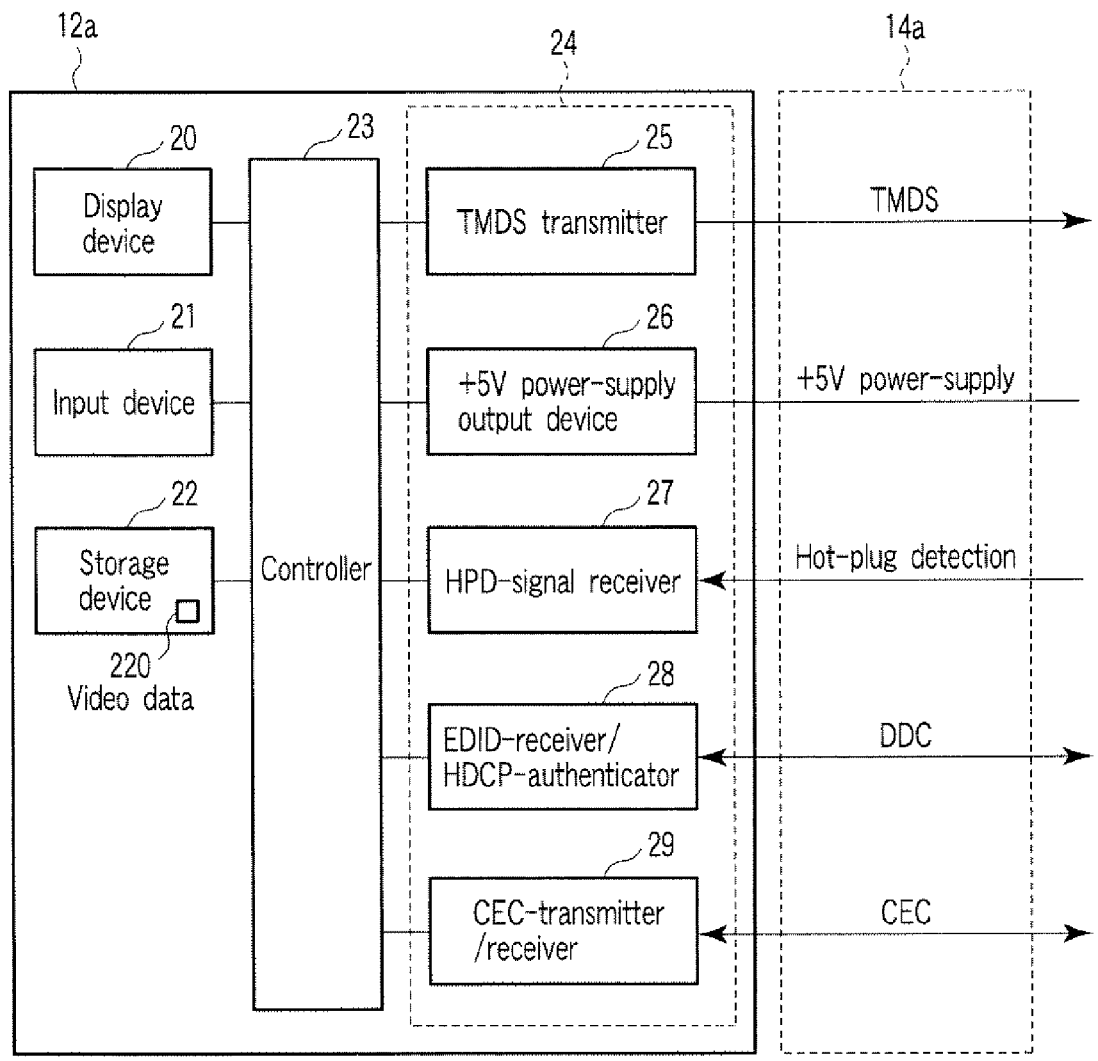
F I G. 2

| State of the sink apparatus / Terminals of the sink apparatus | Standby | On | |
|---|---|---|---|
| | | HDMI not selected | HDMI selected |
| HPD potential | High | High | High |
| EDID reading | OK | OK | OK |
| HDCP authentication | NG | NG | OK |
| TMDS potential | Low | Low | High |

FIG. 5B  HPD terminal of HDMI port 1 — High

FIG. 5C  HPD terminal of HDMI port 2 — High, Low

FIG. 5D  HPD terminal of HDMI port 3 — High, Low

APPARATUS AND METHOD OF RECEIVING DATA FROM AUDIO/VIDEO EQUIPMENT

CROSS-REFERENCE TO RELATED APPLICATIONS

This is a Continuation Application of PCT Application No. PCT/JP2008/061599, filed Jun. 19, 2008, which was published under PCT Article 21(2) in English.

This application is based upon and claims the benefit of priority from Japanese Patent Application No. 2007-166635, filed Jun. 25, 2007, the entire contents of which are incorporated herein by reference.

BACKGROUND

1. Field

One embodiment of the invention relates to an apparatus and method for receiving video data via a digital interface.

2. Description of the Related Art

An example of a multimedia interface between a video-data transmission apparatus, such as a DVD player, a digital tuner and a set-top box, and a video data-data receiver apparatus, such as a TV receiver and a monitor, is one complying with the high definition multimedia interface (HDMI) standard (High-Definition Multimedia Interface Specification Version 1.3a). Any apparatus that has an HDMI output terminal is called a source apparatus, and any apparatus that has an HDMI input terminal is called a sink apparatus. The video-data transmission apparatus is a source apparatus, while the video data-data receiver apparatus is a sink apparatus. Any apparatus that has an HDMI input terminal and an HDMI output terminal and performs both the function of a source apparatus and the function of a sink apparatus is known as a repeater apparatus.

When the source apparatus is connected to the sink apparatus, the source apparatus transmits a +5V power-supply signal to the sink apparatus, informing the sink apparatus that the source apparatus has been connected to the sink apparatus. The +5V power-supply signal is also a signal showing that the source apparatus is ready to operate.

Upon receiving the +5V power-supply signal, the sink apparatus starts making itself prepared to receive video data. When so prepared, the sink apparatus transmits a hot-plug detection (HPD) signal (High signal) to the source apparatus. The hot-plug detection (HPD) signal is also a signal showing that the sink apparatus is now ready to receive video data.

The sink apparatus has an EDID memory that stores extended display identification data (EDID), i.e., the video-format data that the sink apparatus can display. The video-format data includes video specification items such as video format, resolution and sync frequency, and audio specification items such as audio-data format, sampling frequency Fs and bit length.

Upon receiving the HPD signal at a high level, the source apparatus reads the EDID from the EDID memory of the sink apparatus through a display-data channel (DDC) line, reading the video-format data, which is written in the EDID and in which the sink apparatus can display video data.

The source apparatus transmits and receives data required to achieve the authentication of high-bandwidth digital content protection (HDCP), to and from the sink apparatus through the DDC line. The data required to achieve the authentication is, for example, HDCP key data. In this instance, the HDCP key data is assumed to be stored in a storage area the sink apparatus has. For the source apparatus, to authenticate the high-bandwidth digital content protection is to confirm that the sink apparatus is authorized to receive video signals. Upon authenticating the high-bandwidth digital content protection, the source apparatus decrypts the video data with the secret-key data shared with the sink apparatus, and then transmits the video data, thus decrypted, to the sink apparatus.

After reading and authenticating the EDID, the source apparatus transmits video data, audio data and AUX data, all complying to the sink-apparatus format, to the sink apparatus by means of transmission minimized differential signaling (TMDS).

The HDMI standards describe optional standards concerning the mutual control of apparatuses, known as consumer electronic control (CEC). HDMI devices are tree-connected by repeaters. The CEC utilizes a single-line, low-speed serial bus. One of the functions the CEC achieves is a one-touch display in which the source apparatus controls the sink apparatus. When the source apparatus (e.g., a DVD player) is set to the playback mode (that is, when the playback button on the apparatus is pushed), the source apparatus controls the sink apparatus (e.g., a TV receiver) and to automatically turns on the sink apparatus if necessary and automatically connect the signal path to it (i.e., DVD player). Thus, the source apparatus enables the sink apparatus to display the image played back.

In order to designate one of apparatuses so that a switching device may be controlled to set a signal path, all apparatuses must have a physical address each. The physical address of the source apparatus is written in the EDID of the sink apparatus or the EDID of the repeater apparatus. When the apparatuses are mutually tree-connected anew or disconnected from the tree connection, changing the tree connection, physical addresses are detected. Thus, the physical addresses of all sink apparatuses and all repeater apparatuses are detected and propagated. If the tree connection is composed of five stages at most, the address of each apparatus is a four-digit data item, represented as "n.n.n.n." Any sink apparatus or repeater apparatus that serves as a route, generates its physical address "0.0.0.0." The sink apparatus or repeater apparatus reads its physical address from the EDID memory of the sink apparatus connected to it.

The timing the source apparatus or repeater apparatus reads its own physical address is the time when it receives the high-level HPD signal that the sink apparatus or repeater apparatus transmits in response to the +5V power-supply signal it receives from the source apparatus. The sink apparatus has a plurality of HDMI ports, but only one EDID memory. Hence, the source apparatus or repeater apparatus may fail to read its own physical address, depending on whether or not power is supplied to the source, sink and repeater apparatuses and whether or not the switching device has set a signal path for any apparatus designated.

Assume that a source apparatus #1 is connected to a port #1 of a sink apparatus (thus, the port #1 is selected). In this case, the source apparatus #1 acquires physical address "1.0.0.0" when the HPD signal rises to a high level. The source apparatus #1 holds this physical address even after the HPD signal falls back to a low level. If the source apparatus is pulled out of the port #1, the sink apparatus cannot detect this event because the HPD signal is now at a low level. The HPD signal remains low even if the source apparatus #1 is connected to a port #2, because the port #2 is not selected. Consequently, the source apparatus #1 keeps holding the physical address of the port #1, and cannot acquire the correct physical address "2.0.0.0." Therefore, correct CEC control may not be performed.

Thus, any apparatus that receives video data from a data transmission apparatus through a conventional digital interface, e.g., HDMI, must exchange physical addresses with the data transmission apparatus so that the data receiver apparatus and the data transmission apparatus may control each other. However, the data transmission apparatus may fail to read the physical address of the data receiver apparatus, depending on what state the apparatuses assume and which apparatus the switching device selects.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary view showing a circuit diagram of a source apparatus according to the first embodiment of the invention;

FIG. 4 is an exemplary view showing levels of terminals of the sink apparatus depending on the state of the sink apparatus according to the first embodiment of the invention; and FIGS. 5A, 5B, 5C, and 5D are an exemplary view showing levels of HPD terminals of HDMI port according to the first embodiment of the invention.

DETAILED DESCRIPTION

Various embodiments according to the invention will be described hereinafter with reference to the accompanying drawings.

Figure 1:
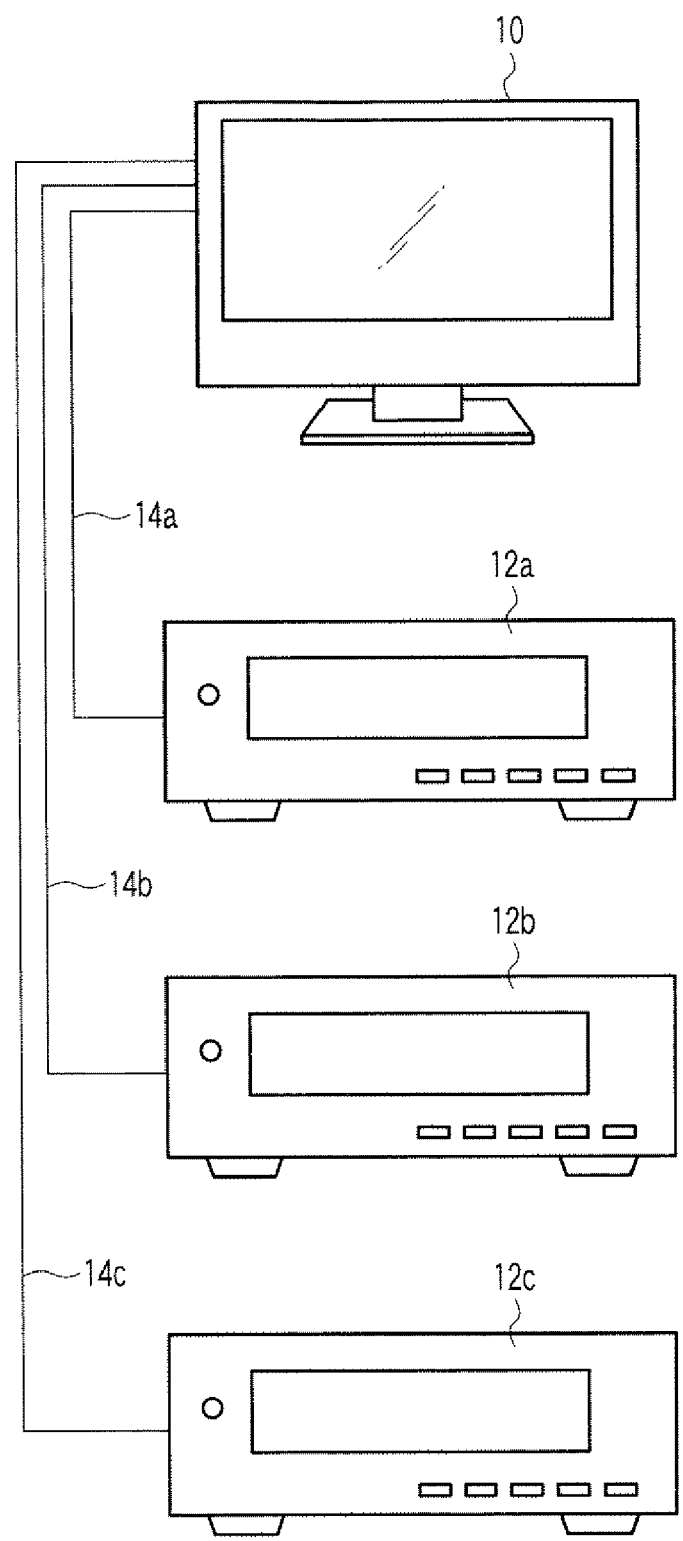
FIG. 1 is an exemplary view showing an entire video system according to a first embodiment of the invention.

According to an embodiment, FIG. 1 is a schematic diagram showing a video system according to an embodiment of the present invention.

The video system has a video-data receiver apparatus (i.e., sink apparatus) 10 and video-data transmission apparatuses (for example, three apparatuses) (i.e., source apparatuses) 12a, 12b and 12c. HDMI cables 14a, 14b and 14c connect the video-data transmission apparatuses 12a, 12b and 12c, respectively, to the video-data receiver apparatus 10. The video-data transmission apparatuses 12a, 12b and 12c are, for example, digital versatile disc (DVD) players, streaming video-data transmission apparatuses, tuners, set-top boxes, or game apparatuses. The video-data receiver apparatus 10 is, for example, a television receiver, or a monitor for a personal computer (PC), or the like.

FIG. 2 is a diagram showing a configuration of the video-data transmission apparatus 12a. As shown in FIG. 2, the video-data transmission apparatus 12a comprises a display device 20, an input device 21, a storage device 22, a controller 23, and an HDMI output port 24. The display device 20 displays a playback time of video. The input device 21 may be operated to make the apparatus 12a perform various operations. The storage device 22 stores video data 220 and the like. The controller 23 controls the display device 20, input device 21 and storage device 22. The HDMI output port 24 is connected to the HDMI cables 14a, 14b or 14c. The HDMI output port 24 has pins that are responsible, respectively, for transmission minimized differential signaling (TMDS), +5V power supply, hot-plug detect (HPD), digital data channel (DDC) and consumer electronics control (CEC). The DDC line is almost identical in specification to an inter-integrated circuit ($I^2C$) bus.

The HDMI output port 24 has a TMDS transmitter 25, a +5V power-supply output device 26, an HPD-signal receiver 27, an EDID-receiver/HDCP-authenticator 28, and a CEC-transmitter/receiver 29. The TMDS transmitter 25 transmits video data, audio data and auxiliary data. The +5V power-supply output device 26 outputs a +5V power-supply signal (source-ready signal) when the video-data transmission apparatus 12a is connected to the sink apparatus 10 or repeater apparatus. In other words, the +5V power-supply signal informs the sink apparatus 10 or repeater apparatus that the source apparatus 12a has been connected (or that the sink apparatus 10 is ready). The EDID-receiver/HDPC-authenticator 28 receives EDID, i.e., data representing the product information of the sink apparatus connected and the video format compatible to the sink apparatus, and also authenticates the sink apparatus connected. The CEC-transmitter/receiver 29 can transmit and receive an apparatus control signal and a CEC, i.e., control protocol.

Figure 3:
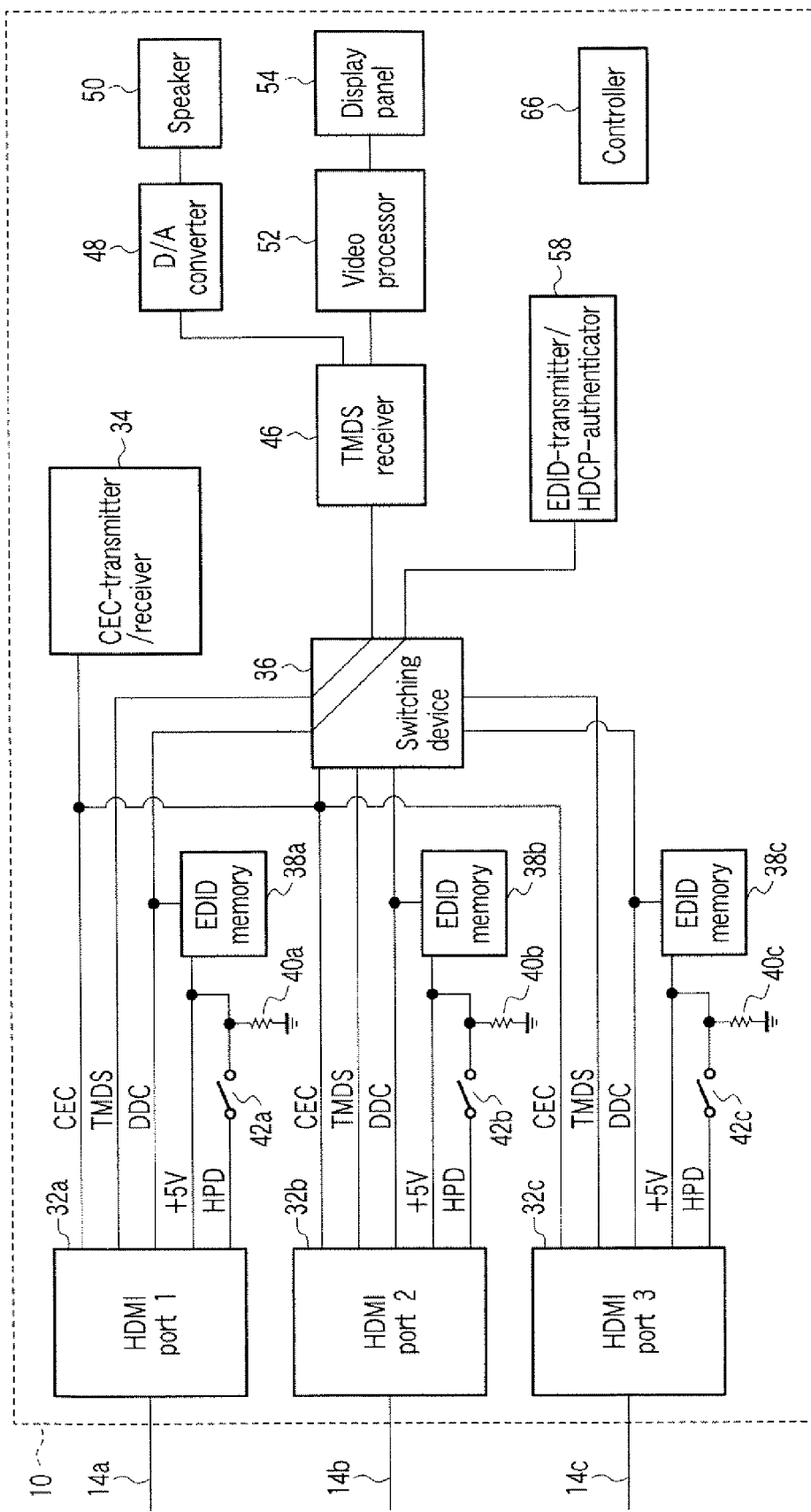
FIG. 3 is an exemplary view showing a circuit diagram of a sink apparatus according to the first embodiment of the invention.

FIG. 3 shows a circuit configuration of the video-data receiver apparatus 10. As shown in FIG. 3, the video-data receiver apparatus 10 has a plurality of HDMI input ports, or more precisely three HDMI input ports 32a, 32b and 32c. In the video-data receiver apparatus 10, a switching device 36 selects one of the HDMI input ports 32a, 32b and 32c.

The HDMI input ports 32a, 32b and 32c have the same pin arrangement as the HDMI output port 24.

The CEC lines of the HDMI input ports 32a, 32b and 32c are connected, in common, to a CEC-transmitter/receiver 34.

The TMDS line and DDC line of each HDMI input port are connected to each of the three input terminals of the switching device 36, which has one output terminal. The DDC lines of the HDMI input ports 32a, 32b and 32c are respectively connected to EDID memories 38a, 38b and 38c which are formed of nonvolatile memories. They are not limited to flash memories. Rather, they may be hard disks or RAMs with a backup power supply. The EDID memories 38a, 38b and 38c store the physical addresses allocated to the source apparatuses 12a, 12b and 12c that are connected to the HDMI input ports 32a, 32b and 32c, respectively. If the sink apparatus 10 has physical address "1.0.0.0," the EDID memory 38a stores "1.1.0.0," the DID memory 38b stores "1.2.0.0," and the EDID memory 38c stores "1.3.0.0."

The +5V lines of the HDMI ports 32a, 32b and 32c are connected to the EDID memories 38a, 38b and 38c, respectively. The HPD lines of the HDMI ports 32a, 32b and 32c are connected to the +5V lines via switches 42a, 42b and 42c, respectively. The connection points of the switches 42a, 42b and 42c and EDID memories 38a, 38b and 38c are connected to the ground potential via pull-down resistors 40a, 40b and 40c. The switches 42a, 42b and 42c are normally on. They are turned off for a short constant time when the switching device 36 switches over or when the sink apparatus 10 changes in operating state.

The TMDS line of any HDMI input port that the switching device 36 selects is connected to a TMDS receiver 46, whereas the DDC line of the HDMI input port is connected to an EDID-transmitter/HDCP-authenticator 58.

A video signal output from the TMDS receiver 46 is supplied via a video processor 52 to a display panel 54, while an audio signal is supplied via a D/A converter 48 to a speaker 50.

The controller 66 controls the other components of the sink apparatus 10.

Figures 4, 5A:
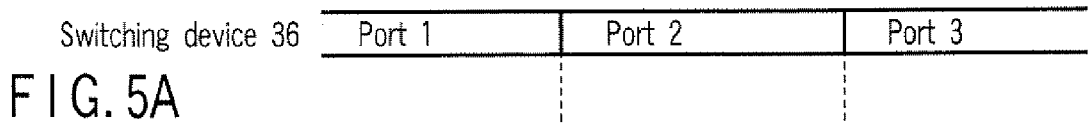

FIG. 4 shows the various states of the sink apparatus 10 in accordance with the potentials at the various terminals of the sink apparatus.

"Standby" shown in FIG. 4 is the state in which the display does not display an image even if the power is supplied to the sink apparatus 10. In this state, the HPD signal is high, irrespective of whether the switching device 36 selects the HDMI port 32a, 32b or 32c. Therefore, the EDID memory 38a, 38b or 38c can be read (OK), the HDCP authentication cannot be performed (NG), and the TMDS potential is low.

As indicated above, the +5V line is connected to the HPD line in the sink apparatus 10 and the HPD line is connected to the ground potential via the pull-down resistor 40a, 40b or 40c. The HPD line therefore remains at +5V (high) as long as the source apparatus 12a, 12b or 12c is connected to the HDMI input port 32a, 32b or 32c. Hence, the source apparatus 12a, 12b or 12c can read data from the EDID memories 38a, 38b and 39c.

However, the HDCP authentication cannot be performed (NG). This is because the source apparatus 12a, 12b or 12c needs not perform the HDCP authentication while the sink apparatus 10 remains in the standby state. Further, while the sink apparatus 10 remains in the standby state, the source apparatus 12a, 12b or 12c transmits no video data to the sink apparatus 10. Therefore, the TMDS potential is low.

While the sink apparatus 10 is on (that is, the display device is on in the case where the sink apparatus 10 is a TV receiver), some terminals each assume one state or the other, in accordance with whether the switching device 36 selects which port 32a, 32b or 32c.

As described above, the +5V line extending from the source apparatus 12a, 12b or 12c is connected to the HPD line provided in the sink apparatus 10 and the HPD line is connected to the ground potential via the pull-down resistor 40a, 40b or 40c. The HPD line therefore remains at +5V (high) as long as the source apparatus 12a, 12b or 12c is connected to the HDMI input port 32a, 32b or 32c. Since the HPD line remains at +5V, the source apparatus 12a, 12b or 12c can read data from the EDID memories 38a, 38b or 39c.

Nonetheless, the HDCP authentication for any port not selected by the switching device 36 is disabled (NG), whereas the HDCP authentication for any port selected is enabled (OK). This is because it suffices to perform HDCP authentication utilizing the DDC line for only the source apparatus 12a, 12b or 12c connected to the HDMI input port selected by the switching device 36. Similarly, the TMDS potential is high for only the port 32a, 32b or 32c selected, and is low for any port not selected, because video data is transmitted to the sink apparatus 10 from only the source apparatus 12a, 12b or 12c selected by the switching device 36. It should be noted, however, that the TMDS potential at any port not selected may be set to a high level, not limited to a low level.

When the source apparatus 12a, 12b or 12c is connected to any one of the HDMI ports of the sink apparatus 10, the source apparatus 12a, 12b or 12c transmits a +5V power-supply signal to the sink apparatus 10. In the sink apparatus 10, the +5V power-supply signal is folded back, providing an HPD signal. The HPD signal is transmitted to the source apparatus 12a, 12b or 12c. As seen from FIG. 4, the HPD signal is at a high level (indicating the connection-detected state) at all times, irrespective of which HDMI port the switching device 36 selects or in which state the sink apparatus 10 is operating.

Upon receiving the HPD signal at a high level, the source apparatus 12a, 12b or 12c reads the EDID via the DDC line from the EDID memory 38a, 38b or 38c of the sink apparatus 10. The source apparatus 12a, 12b or 12c thus acquires, from the EDID memory 38a, 38b or 38c of the sink apparatus 10, the physical address and the video-format data representing the format in which the sink apparatus 10 can display images. When the HPD signal rises from a low level to a high level, the source apparatus 12a, 12b or 12c exchanges the HDCP key data items indispensable for the HDCP authentication, with the sink apparatus 10 through the DDC line. The HDCP key data is stored in the EDID memory 38a, 38b or 38c of the sink apparatus 10, too. If the HDCP authentication succeeds, the source apparatus 12a, 12b or 12c encrypts the video data 220 with the secret key shared with the sink apparatus 10, generating video data of the TMDS format complying with the sink apparatus 10. This video data is transmitted to the sink apparatus 10.

Once the EDID memories 38a, 38b or 38c, each of which stores a physical address, and a source apparatuses have been connected to HDMI ports 32a, 32b or 32c, the sink apparatus 10 transmits an HPD signal at a high level to the source apparatuses 12a, 12b and 12c in response to the +5V power-supply signal even if the HDMI port 32a, 32b or 32c is not selected by the switching device 36. The source apparatus 12a, 12b or 12c can therefore read its own physical address even if it is not selected. Moreover, even if the sink apparatus 10 is in a standby states the source apparatus 12a, 12b or 12c can read the physical address. The source apparatus 12a, 12b or 12c can thus reliably acquire the physical addresses necessary for achieving the CEC control.

Only the HDMI input port 32a, 32b or 32c selected by the switching device 36 is connected to the HDCP-authenticator 58. Since the HDCP-authenticator 58 cannot perform the HDCP authentication while the sink apparatus 10 remains in the standby state, wasteful authentication can be prevented.

The source apparatuses 12a, 12b and 12c may be designed to display an alert such as an authentication error if the HDCP authentication cannot be performed (NG). In this case, each source apparatus 12a, 12b or 12c checks the TMDS potential at each port, determining whether the potential is high or low. If HPD=high and TMDS=low, the source apparatus 12a, 12b or 12c does not display an alert even if the HDCP authentication is NG.

As seen from FIG. 4, the HPD terminal is always high. As the HDMI standard describes, however, the sink apparatus starts the HDCP authentication when the HPD signal rises from a low level to a high level. Hence, the sink apparatus may not perform the HDCP authentication when the HDMI port is switched over and its state changes (from the standby state to the on-state) under the status shown in FIG. 4.

Thus, the HPD line connected to any port that the switching device 36 selects (i.e., any port not selected a moment before) is set to a low level for a moment, (e.g., 500 milliseconds) and then back to a high level. This can be accomplished by momentarily turning off the switch 42a, 42b or 24c provided on the HPD line. In this regard, it should be noted that the switches 42a, 42b and 24c are normally on, but are off for a moment when the ports on which the switching device 36 stops selecting them. Also note that any switch 42a, 42b or 42c that is connected to the HDMI port selected under the control of the controller 66 is momentarily turned off when the state of the sink apparatus changes from the standby state to the on-state.

The HPD terminal is therefore high at all times. Nonetheless, the HDCP authentication can be performed when the HDMI port is switched from one to another or when the sink apparatus changes in state. This prevents illegal use of the correct encryption-decryption key.

As has been explained, appropriate physical addresses can be given to all source apparatuses connected to the DHMI input ports in the first embodiment of the present invention.

According to the present invention, as described above, nonvolatile storages for storing physical addresses are connected between the address terminals and switching devices of the data receiver apparatus, and a connection detection signal which is output from the detection terminal of each input port is asserted on the voltage detected. The data transmission apparatuses can read their physical addresses from the data receiver apparatus, irrespective of the power-supply state of the data receiver apparatus or whether the switching devices are selected or not.

The present invention is not limited to the embodiment described above. The components of any embodiment can be modified in various manners in reducing the invention to practice, without departing from the sprit or scope of the invention. The method of transmitting an HPD signal at a high level, for example, is not limited to the method explained with reference to FIG. 3, and can be modified in various ways. For instance, a +5V HPD signal may be generated from the power supply of the sink apparatus. In this case, the sink apparatus transmits the +5V HPD signal to the source apparatuses when it becomes operative, irrespective of whether it has received a +5V HPD signal from any source apparatus, or when it confirms that it has received a +5V HPD signal from any source apparatus.

Further, the components of the embodiment described above may be combined, if necessary, in various ways to make different inventions. For example, some of the components of the embodiment may not be used. Moreover, the components of the different embodiments may be combined in any desired fashion.

Still further, the present invention may be applied to a computer-readable recording medium holding a program that causes computers to execute prescribed means or to operate as specific means or to perform specific functions.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A data receiver apparatus comprising:
    input ports which comply with a prescribed digital interface standard; and
    a switching device which is configured to select any one of the input ports, wherein
    each of the input ports comprises a voltage signal terminal configured to receive a prescribed voltage signal transmitted from a data transmission apparatus, a detection terminal configured to output a connection detection signal to the data transmission apparatus, a data input terminal configured to receive a data signal transmitted from the data transmission apparatus, and an address terminal configured to transmit a physical address to the data transmission apparatus, and
    the switching device which is configured to select data signals supplied from the data input terminals of the input ports, and the data receiver apparatus further comprising:
    nonvolatile storage devices each of which is connected between the address terminal and the switching device and which are configured to store physical addresses associated with the input ports; and
    a setting unit which is configured to set the connection detection signal output from the detection terminal of the input ports to a detection-state voltage irrespective of whether the switching device selects the data input terminal of the input ports.

2. The data receiver apparatus according to claim 1, wherein the setting unit is configured to set the connection detection signal to the detection-state voltage when the data transmission apparatus is connected to one of the input ports, and is configured to set the connection detection signal output from the detection terminal of the one of the input ports to a non-detection-state voltage for a prescribed period and then set the connection detection signal back to the detection-state voltage when the switching device selects the one of the input ports.

3. The data receiver apparatus according to claim 1, wherein the setting unit is configured to set the connection detection signal to the detection-state voltage when the data transmission apparatus is connected to one of the input ports, and is configured to set the connection detection signal output from the detection terminal of any input port selected by the switching device to a non-detection-state voltage for a prescribed period and then set the connection detection signal back to the detection-state voltage when the data receiver apparatus is switched from a standby state to an on state.

4. The data receiver apparatus according to claim 1, wherein the detection-state voltage of the connection detection signal, which the setting unit sets, is a voltage of the prescribed voltage signal.

5. The data receiver apparatus according to claim 4, wherein the voltage signal terminal is connected to the detection terminal, and a connection point of the voltage signal terminal and the detection terminal is connected to a reference potential via a resistor.

6. The apparatus according claim 1, wherein the prescribed digital interface standard is high definition multimedia interface (HDMI) standard.

7. A data receiving method for use in a system which comprises a data transmission apparatus including an output port complying with a prescribed digital interface standard, and a data receiver apparatus including input ports complying with the digital interface standard, physical address memories connected to the input ports, and a switching device configured to select any one of input signals supplied from the input ports, the data receiving method comprising:
    transmitting a prescribed voltage signal from the data transmission apparatus to the data receiver apparatus;
    transmitting a connection detection signal from the data receiver apparatus to the data transmission apparatus;
    reading, by the data transmission apparatus, a physical address from one of the physical address memories connected to one of the input ports to which the data transmission apparatus is connected when the connection detection signal is at a connection detection potential;
    detecting, by the data transmission apparatus, a connection of a data input terminal when the connection detection signal changes from a non-connection detection potential to a connection detection potential;
    performing, by the data transmission apparatus, an authentication when the connection of the data input terminal is detected;

encrypting data in a prescribed encryption method by the data transmission apparatus when the authentication succeeds; and transmitting the encrypted data to the data receiving apparatus from the data transmission apparatus, and wherein the connection detection signal is set to the connection detection potential when the data transmission apparatus is connected to the input port.

8. The data receiving method according to claim 7, wherein, when one of the input ports is changed from a non-selection state to a selection state, the connection detection signal output from a detection terminal of the one of the input ports is set to the non-connection detection potential for a prescribed period.

9. The data receiving method according to claim 7, wherein, when the data receiver apparatus is changed from a standby state to an on state, the connection detection signal output from a detection terminal of one of the input ports which is selected by the switching device.

* * * * *